Patented Jan. 9, 1940

2,186,162

UNITED STATES PATENT OFFICE 2,186,162

PROCESS OF GLUTAMIC ACID RECOVERY FROM SOLUTIONS

Géza Braun, New York, N. Y., assignor to Standard Brands Incorporated, New York, N. Y., a corporation of Delaware No Drawing. Application October 15, 1936, Serial No. 105,829

5 Claims. (Cl. 260—534)

In the production and recovery of glutamic acid, the latter may be formed by the treatment of a glutamic acid-yielding material such as wheat gluten with an acid such as an aqueous solution of hydrochloric acid under certain conditions and from the resulting glutamic acid hydrochloride solution a considerable proportion of the glutamic acid may be separated by various methods, one suitable method being the addition, to the glutamic acid hydrochloride solution, of an alkali, such for example as sodium hydroxide, in such proportion as to combine with the hydrochloric acid forming a constituent part of the glutamic acid hydrochloride (and also with any free hydrochloric acid present). By such treatment, a large proportion of the glutamic acid present is precipitated in the form of free glutamic acid and by suitable repeated concentrations of the remaining solution, followed by cooling, further quantities of free glutamic acid may be crystallized. However, in processes of such general character, even after repeated crystallizations, a mother liquor customarily remains as a final product containing about 10% to 20% of the total amount of glutamic acid present in the original reaction product or hydrolysate and it has heretofore been considered impractical to recover this residual content of glutamic acid from the final mother liquor.

An object of my present invention is the substantially complete recovery of the contained glutamic acid from mother liquors, such as those of the character just mentioned, in an economical and practical manner so that substantially all of the glutamic acid formed in a process such as mentioned is eventually recovered.

If a mother liquor is to be treated which is derived from a process in which ammonium salts such as ammonium acetate or ammonium formate or nitrogen bases such as pyridine have been used for precipitating the glutamic acid, or if a solution is to be treated such as is derived from crude glutamic acid hydrochloride containing ammonium chloride, the treatment of the final mother liquor involves first making it alkaline with the hydroxide of an alkaline earth metal such as the hydroxide of barium, calcium or strontium; ammonia or nitrogen bases such as pyridine which may be present are then removed from the solution by distillation and are recovered; and thereafter the alkaline earth metal is removed from the solution by precipitating it (suitably by adding a combining proportion of sulfuric acid or oxalic acid). After this precipitation, the precipitate is separated, as by filtration, and the glutamic acid hydrochloride remaining in the solution is recovered, after concentrating the solution, by adding concentrated hydrochloric acid. Merely as an illustrative example of a process of this latter type the following sequence of operations may be employed.

One thousand parts of crude glutamic acid hydrochloride containing some ammonium chloride (such as may result from hydrolyzing protein matter with hydrochloric acid) is dissolved in three thousand parts of water, the solution is treated with any suitable decolorizing carbon or the like, analyzed to determine the amounts of ammonium chloride and total hydrochloric acid present and to calculate the amount of hydrochloric acid to be neutralized, and the amount of ammonium formate or acetate or calcium formate or acetate required for reaction with all free hydrochloric acid and that combined with the glutamic acid in order to precipitate the glutamic acid is calculated and such calculated quantity of ammonium formate or acetate or calcium formate or acetate is added to the solution (a quantity of 256 parts of crystallized ammonium formate having in one instance been found proper for this purpose). Substantially 80% to 90% of the glutamic acid contained in the liquor thus treated is separated in crystalline form immediately upon the addition of the ammonium formate or other reagent added and may be isolated from the associated liquid by filtration. The remaining mother liquor still contains a considerable proportion of the glutamic acid, which has failed to separate in the crystallization just mentioned, together with substantial proportions of ammonium chloride and formic or acetic acid. To this mother liquor there is added a quantity of calcium hydroxide slightly in excess over the calculated amount proportioned to provide sufficient calcium hydroxide for reaction with the ammonium chloride present and with any other ammonium salts present and the ammonia liberated is distilled from the solution, preferably under a reduced pressure, until the solution is substantially freed from ammonia. The distilled ammonia may be recovered in any suitable manner and at the end of the ammonia distillation the remaining mixture is treated with sufficient sulfuric acid (suitably in the form of a dilute aqueous solution of sulfuric acid) to combine with the calcium present and calcium sulfate thus precipitated is separated from the liquid by filtration and the filtrate is concentrated to a syrupy consistency. In effecting such concentration, formic acid or acetic acid is distilled and may be recovered by reaction with ammonia or lime thus producing ammonium formate or acetate or calcium formate or acetate which may be used for reaction with additional material repeatedly.

The residual syrupy material or semi-crystalline mass is treated with ½ to 1 times its volume concentrated (32%) hydrochloric acid (about 250 parts of hydrochloric acid of 32% strength having been found a proper proportion for this purpose in working with quantities of materials as heretofore stated in the illustrative example), the treated material is cooled preferably to about 0° C. and is maintained at about this temperature for about an hour with occasional stirring. By this treatment, glutamic acid hydrochloride is deposited as a crystalline precipitate. This precipitate is separated by filtration and the glutamic acid hydrochloride crystals thus separated are washed with a small quantity of ice cold concentrated hydrochloric acid and dried. About 100 parts of pure glutamic acid hydrochloride is thus obtained, additional to about 800–900 parts previously recovered in the process.

As hereinbefore mentioned, an alkali metal hydroxide can also be applied in the precipitation of the main portion of glutamic acid. However, the use of such hydroxides or of any other basic substance, which cannot subsequently be removed economically from the mother liquor, is not advisable since then the chlorides formed from bases will either contaminate the glutamic acid hydrochloride, if they are insoluble in concentrated hydrochloric acid (such as NaCl or or KCl, etc.), or if soluble in it they may increase the solubility of glutamic acid hydrochloride to such an extent that its crystallization may be entirely prevented. Nevertheless, the above process may still be successfully applied even in such cases since the removal of ammonium chloride—derived from the crude glutamic acid hydrochloride—improves the mother liquor and some of the glutamic acid will be crystallizable in the form of its hydrochloride.

What I claim as my invention and desire to secure by Letters Patent is:

1. In a process of recovery of glutamic acid from a solution containing the same, the step which comprises precipitating glutamic acid from the solution by the addition of ammonium formate.

2. In a process of recovery of glutamic acid from a solution, the step which comprises precipitating glutamic acid from the solution by the addition of ammonium acetate.

3. In a process of recovery of glutamic acid from a solution containing the same, the steps which comprise precipitating glutamic acid from the solution by the addition of an ammonium salt of an innocuous distillable organic acid, separating the precipitated glutamic acid and subsequently adding, to the mother liquor remaining after precipitated glutamic acid has been separated from the so-treated solution, a reagent which will liberate the free organic acid from the added ammonium salt, and distilling and recovering the liberated organic acid.

4. In a process as defined in claim 1, the steps of removing precipitated glutamic acid from the solution and thereafter successively adding, to the remaining mother liquor, reagents respectively liberating ammonia and formic acid and successively distilling and recovering the liberated ammonia and the liberated formic acid.

5. In a process as defined in claim 1, the steps which comprise removing glutamic acid from the solution after its precipitation, adding a reagent liberating ammonia to the remaining mother liquor, distilling the liberated ammonia, recovering the distilled ammonia, reacting the distilled ammonia with formic acid and recovering the ammonium formate produced by this reaction, and adding ammonium formate so produced to a glutamic acid-containing solution under such conditions as to effect precipitation of the glutamic acid thereby from said solutions.

GÉZA BRAUN.